United States Patent [19]

Brabson et al.

[11] Patent Number: 5,715,395
[45] Date of Patent: Feb. 3, 1998

[54] METHOD AND APPARATUS FOR REDUCING NETWORK RESOURCE LOCATION TRAFFIC IN A NETWORK

[75] Inventors: Roy Frank Brabson, Raleigh; James Corvin Fletcher, Cary, both of N.C.

[73] Assignee: International Business Machines Corporation, Armonk, N.Y.

[21] Appl. No.: 304,077

[22] Filed: Sep. 12, 1994

[51] Int. Cl.⁶ .............. G06F 13/14; G06F 13/38
[52] U.S. Cl. .................. 395/200.13; 395/200.11; 395/200.15
[58] Field of Search ............. 395/200.11, 200.13, 395/200.15, 200.1

[56] References Cited

U.S. PATENT DOCUMENTS

| | | | |
|---|---|---|---|
| 4,914,571 | 4/1990 | Baratz et al. | |
| 5,067,074 | 11/1991 | Ferel et al. | 395/200 |
| 5,109,483 | 4/1992 | Baratz et al. | |
| 5,214,778 | 5/1993 | Glider et al. | 395/575 |
| 5,222,242 | 6/1993 | Choi et al. | |
| 5,361,347 | 11/1994 | Glider et al. | 395/575 |
| 5,450,592 | 9/1995 | McLeod | 395/650 |
| 5,454,108 | 9/1995 | Devarakonda et al. | 395/650 |
| 5,513,321 | 4/1996 | Katori | 395/200.15 |
| 5,524,247 | 6/1996 | Mizuno | 395/726 |
| 5,535,335 | 7/1996 | Cox et al. | 395/200.11 |

OTHER PUBLICATIONS

Directory Algorithm for Communication Peer Networks, IBM Technical Disclosure Bulletin (TDB) 03–89 pp. 300–303 P.M. Gopal et. al.

*Primary Examiner*—Alyssa H. Bowler
*Assistant Examiner*—Richard J. Gregson
*Attorney, Agent, or Firm*—John D. Flynn

[57] ABSTRACT

Disclosed is a apparatus and method for reducing resource location traffic in a compute network. The reduction in location traffic is obtained by a method and apparatus such that a node which has initiated a search for a resource which cannot be found starts a timing cycle interval during which subsequent initiating requests at the node are automatically failed without performing the network search. This reduces network traffic for searches that are likely to fail. Also disclosed is a threshold counter that alleviates possible difficulties that this may cause for high demand resources. The threshold counter is incremented each time a search for a specific resource is automatically failed. A network search is performed when either the interval expires or the threshold counter exceeds a threshold count.

19 Claims, 9 Drawing Sheets

| RESOURCE IDENTIFIER | UNAVAILABILITY PERIOD |
|---|---|
|  |  |
|  |  |
|  |  |

FIG. 7A

| RESOURCE IDENTIFIER | SEARCH THRESHOLD |
|---|---|
|  |  |
|  |  |
|  |  |

FIG. 7B

| RESOURCE IDENTIFIER | UNAVAILIBILITY PERIOD | SEARCH THRESHOLD |
|---|---|---|
|  |  |  |
|  |  |  |
|  |  |  |

FIG. 7C

METHOD AND APPARATUS FOR REDUCING NETWORK RESOURCE LOCATION TRAFFIC IN A NETWORK

BACKGROUND OF THE INVENTION

1. Field of the Invention

The present invention relates to a method and apparatus for reducing network overhead traffic and, in particular, to reducing network traffic associated with locating and accessing resources in large networks.

2. Description of the Problem

Today many resources are interconnected by communications into networks. These networks allow resources of the network to be shared. Certain types of networks, such as Advanced Peer-to-Peer Networking (APPN) networks, allow resources located anywhere in a network to be shared among network users. A network can generally be defined as a collection of nodes interconnected through communications links or paths. The nodes may be interconnected by one or more communications paths. The connections provided may be direct or indirect. Networks are typically controlled by a system architecture that ensures the orderly flow of information throughout the system. For example, an overview of the architecture used in computer networks is given in an article entitled, "Computer Network Architecture," by S. Wecker in Computer, September 1979. Another overview, including a description of System Network Architecture (SNA) is given in an article entitled, "An Introduction to Network Architectures and Protocols," by P. E. Green in the IBM Systems Journal, Vol 18, No. 2, 1979. In these articles, the various computer networks such as SNA DNA, ARPANET, etc. are described by means of hierarchical architectural layers, where the lowest layer relates to the physical communication lines interconnecting various nodes of the network and where the highest layer concerns the conversation per se between the various network users. Networks provide network users with network services. Network services enable network users to send and receive messages, establish links or paths, start and stop sessions, share resources and utilize the network.

Nodes typically have physical connections with their neighboring nodes. The links between nodes may be permanent communications links such as conventional cable connections or dedicated wireless connections or links that are enabled only when needed, such as dial-up connections through public or private telephone systems. Nodes within a network are usually subdivided into network nodes and end nodes. A network node is a data processing system that provides certain functions within the network, such as routing of messages between itself and neighboring nodes, selection of routes for messages to be transmitted between two nodes and furnishing of directory services to served end nodes. Some network nodes provide interconnections to other networks and their associated network nodes. End nodes are exemplified by devices such as display terminals, intelligent workstations and the like, which do not provide network services (e.g., routing or route selection or directory services) to other nodes in the network. End nodes may include processors that do not perform services of the kinds performed by network nodes. Collectively, the network nodes, the end nodes and the links between the nodes are referred to as network resources. The physical configuration and characteristics of the various nodes and links are said to be the topology of the network.

The information or data sent via the network between resources in the network may be file(s), program(s), data, command(s), multimedia stream(s), source programs, graphic(s), image(s), audio, bit(s), byte(s) or any combination of the above. The information or data may be compressed; or encrypted; or both compressed or encrypted; or neither compressed or encrypted.

Nodes typically are associated with one or more resources. Each of the nodes contains one or more network addressable units, each containing a resource that can be a source or target for communications directed through the network. The term logical unit or LU is used to identify the interface between an network user located at a network addressable unit and the remainder of the network. The term network user encompasses both human users and computer programs being executed at the network addressable unit. As such, network users may be people, applications, routines, computer programs, tasks, processes, operating systems, or hardware. The network addressable unit may be a terminal, workstation, personal computer, mobile computer, personal digital assistant or any other hardware. For instance a printer may be a network user that receives instruction(s), file(s), message(s) from a resource requesting its services or information. A printer may also need to send status messages back to other networks users or the printer operator (another network user). These status messages may be returned in response to an event such as out of paper, buffer full and/or buffer empty.

The Network node associated with a resource provides or procures network services for the associated resources. Thus, the resources or network users associated with a Network node utilize the node to provide network services. To select a route between any two resources at different logical units in a network or to set up a logical connection or session between those two logical units requires that the Network node responsible for route selection or session establishment have information about both the resources. The necessary information includes the location and characteristics of each resource.

In some networks a resources can communicate with other resources. In order to provide for communication (i.e., send data or information, open a channel or establish a session) between a source resource and a target resource, most networks require that the target resource's location in the network be known. Without knowing the location, communication cannot be established. If the target resource location is not known then it may be obtained by searching the network for the target resource. Searching for target resources can be performed in a variety of ways such as directed searching or broadcast searching. The network traffic generated in attempting to determine the location of the target resource (i.e., locate the target resource) is referred to as network resource location traffic. Network location traffic is overhead traffic that does not result in the transmission of data or information from one network user to another network user (or one resource to another resource). If the target resource cannot be found, the request that resulted in the search is failed. A subsequent search for the same resource results in another search of the network and another potential search failure. This subsequent search is likely to fail unless the network has changed in some fashion to make the target resource locatable, reachable or available. Resources may be unavailable, unreachable or unlocatable for numerous reasons such as a network failure(s) or network outage(s). A high rate of network searching, in particular broadcast searching, results in excessive network location traffic throughout the network. This network searching activity can generate much network traffic and thus seriously degrade the capacity of the network for other types of operations. This is particularly a problem for networks with low capacity links which can become traffic bottlenecks.

It is important to distinguish between the physical address of the target resource and the logical address. The physical address may change depending on where the resource is connected to the network, the logical address or resource identifier can remain the same. In locating a resource we are referring to determining its physical address. Once the target resource location is determined (or found) an appropriate channel or session can be established and the information or data can be sent or communicated.

Network searches by their very nature use network resources such as bandwidth, channel capacity, control blocks and memory etc. This network utilization is intensified further if broadcast searching is utilized. Searches cause nodes to exchange messages and expend network resources when attempting to locate the requested target resource. This is compounded if broadcast searching is used. Broadcast searching is typically used when no information is known or readily attainable about the location of a target resource or when prior directed searching has failed. If a broadcast search is used, nodes must propagate and track the progress of locate searches. Searching utilizes channel capacity, CPU time and memory. The utilization of the network can be severely impacted by the amount of resource location traffic generated by network searching. This is especially the case when a network outages or failures occur. In these cases low capacity links between nodes may be swamped with network location traffic, causing severe network degradation.

Resources become unavailable, unreachable or unlocatable for a variety of reasons. A gateway node or connecting node or bridge node may fail resulting in whole sections of the network and the associated resources becoming unreachable. A single node may fail. Also a requested resource may not be attached to the network, may be turned off, or down for repair. The efficient location of resources, is a necessity for networks especially dynamic networks which permit resources to dynamically enter and exit the network. Dynamic networks, as their name implies, are constantly changing with resources and nodes entering and exiting the network, often changing their physical network address. Dynamic networks, in particular, require the efficient location of resources. As networks become more dynamic, the addition and relocation of resources and network users occurs more frequently and requires ever more efficient location of resources in the network. Most networks are both large and extremely dynamic in that resources are often moved, added, deleted or assume new characteristics (e.g., available/not available) while remaining in the network.

The problem of efficient location of resources in a network is further compounded with network outages or when network resources fail such that one or more network resources become unavailable, unreachable or unlocatable. During the period of unavailability, network users or resources will continue to attempt to locate the unavailable resources and continue to request that the network locate the resource. If the network outage is such that the desired resource is unavailable, continual and repeated searching of the network will occur resulting in a degradation of the network. This problem is further amplified if the unavailable resource is a critical resource or a high demand resource.

A method and apparatus is required to reduce the impact to the network when resources become unavailable, unreachable or unlocatable.

SUMMARY OF THE INVENTION

The present invention is directed to a method and apparatus for reducing the impact of network resource location traffic when resources become unavailable, unreachable, or unlocatable.

It is an object of the invention to reduce resource location traffic in a network.

It is another object of the invention to reduce network overhead that occurs with unnecessary or redundant searches for unavailable, unreachable or unlocatable resources.

It is a still a further object of the invention to increase network efficiency by increasing the throughput of data or information between network users by reducing network overhead.

It is yet a further object to increase the throughput of data or information between network users by reducing network resource utilization in locating resources.

It is an object of the invention to increase network performance when network outages or failures occur.

It is yet another object of the invention to reduce the network resources utilized for locating resources in the network.

Accordingly, the present invention is a general method and apparatus of reducing resource location traffic in a computer network. The reduction in location traffic is obtained by a method and apparatus such that a node which has initiated a search for a resource which cannot be found starts a timing cycle interval during which subsequent initiating requests at the node are automatically failed without performing the search. This reduces network traffic for searches that are likely to fail. In the preferred embodiment the present invention also alleviates possible difficulties that this may cause for high demand resources by having a threshold counter which is incremented each time a search for a specific resource is automatically failed. A network search is performed when either the interval expires or the threshold counter exceeds a threshold count.

BRIEF DESCRIPTION OF THE DRAWINGS

The foregoing and other objects, aspects and advantages of the invention will be better understood from the following detailed description with reference to the drawings, in which:

FIGS. 7(a), 7(b) and 7(c) depict several logical views of an Unavailable Resource Table.

DETAILED DESCRIPTION OF THE PREFERRED EMBODIMENT

The use of our invention is not restricted to any specific type of computer network. It works well with the IBM System Network Architecture (SNA) and will be described in that environment. Further information on SNA terms and concepts can be found in Systems Network Architecture Technical Overview, IBM Publication GC30-3073-2, September 1986. An overview of methods for dynamically locating resources is given in the article entitled "SNA Networks of Small Systems" by Baratz et al in the IEEE J. Selected Areas in Communications, Vol. SAC-3, No. 3, May 1985. Comprehensive descriptions of the SNA architecture may be also found in a number of publications, including IBM Systems Network Architecture-Format and Protocol Reference Manual: Architecture Logic (SC30-3112), or SNA: IBM's Networking Solution, James Martin and Kathleen K. Chapman, Prentice-Hall, Inc., Englewood Cliffs, N.J. The description provided herein, in terms of SNA systems, should not be construed as a limitation on the scope of our invention, as it is within the capabilities of one skilled in the computing arts to use the invention in other types of networks.

SNA provides for the interconnection of nodes of a computer network. Two types of nodes are of particular interest: Network nodes (NNs) and End nodes (ENs). An NN provides session establishment, directory services and session traffic routing services to other nodes for its own Logical Units (LUs) and for LUs in lower function nodes, ENs. Each node, EN or NN, is responsible for maintaining a directory of its local resources. In addition, each NN is responsible for maintaining directory information about resources that reside in ENs served by it. This is done by system definition (sysdef), either of all of the resource names or of the EN's status as an authorized node that is allowed to dynamically inform its serving NN of its resources. Such as NN is termed a server, and the combination of a server NN and the ENs it serves is termed a domain. The Network nodes can be thought of as servers for the various associated resources which can be considered clients of the server.

Figure 1:
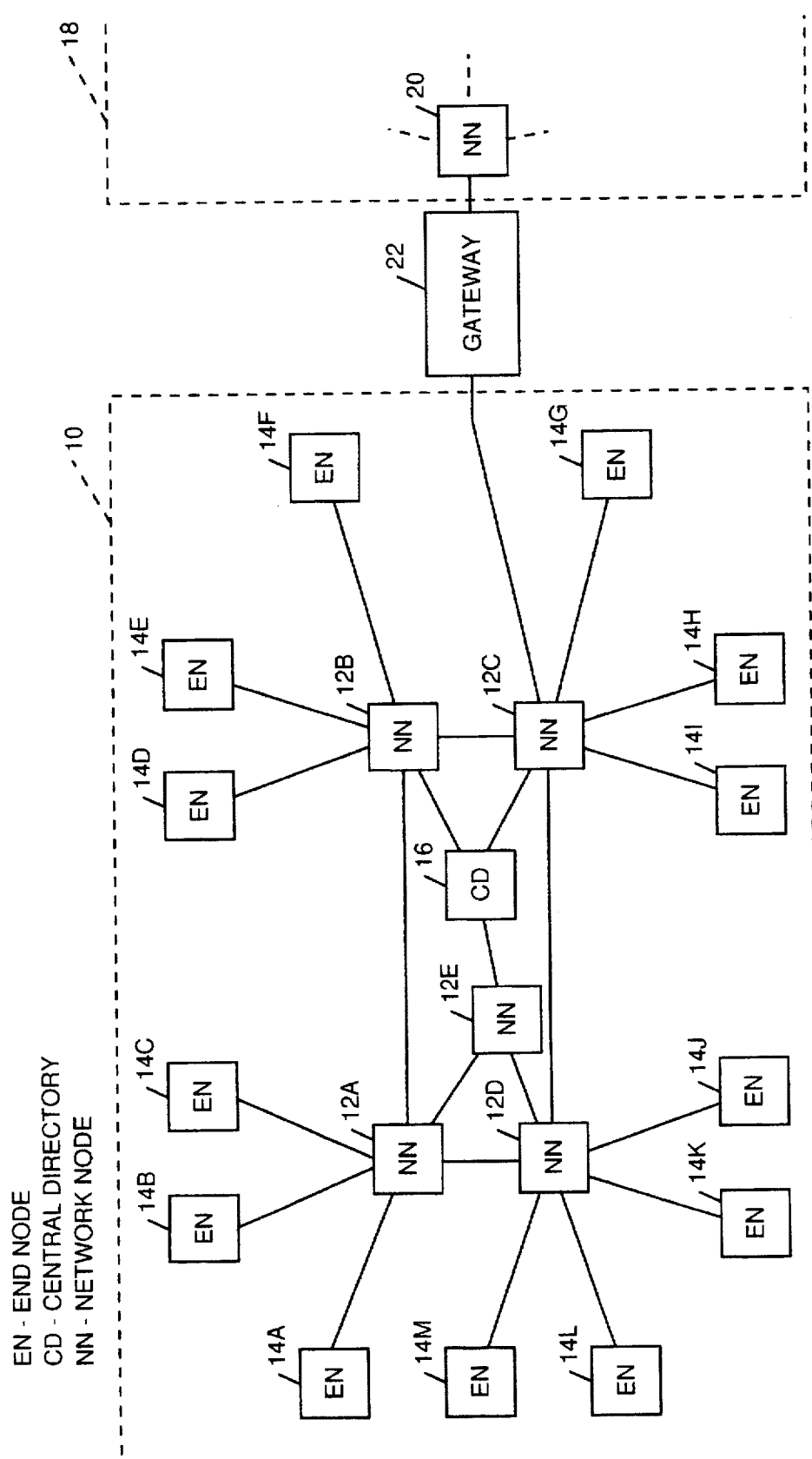
FIG. 1 shows a block diagram of the physical components of a computer network.

In order to better understand the present invention the Network Search procedure (the so called "LOCATE Search" or "LOCATE Procedure") is described below. One embodiment of a network search procedure for permitting a Network node to locate a target resource in a data communications network is described in U.S. Pat. No. 4,914,571 to Baratz et. al. entitled "Locating Resources in Computer Networks", issued Apr. 3, 1990, and assigned to the assignee of the present invention, and which is hereby incorporated by reference. Accordingly, to the teachings of this patent, a Network node responsible for setting up a session between a source logical unit and a target logical unit can perform a LOCATE search to dynamically locate the target and acquire needed information about the characteristics of the target. The location and characteristics are used by the Network node in setting up the session between the source and target logical units. FIG. 1 is a representation of a typical computer network in which a LOCATE process may be used to locate a target resource.

Block 10 identifies a first network which includes a set of Network nodes 12A through 12E, another set of End nodes 14A through 14M and a central directory node 16. Network 10 may be linked to other networks such as a network 18 represented in part by a Network node 20. The two networks are linked through a special Network node 22 known as a gateway or Interface node. Network users (or resources) communicate with each other in conversations carried over sessions established between a source logical unit and a target logical unit. A session is established when a first node sends a BIND request to a second node. The BIND request specifies the protocols that both of the nodes are to abide by for the duration of the session. The BIND sender is known as the primary logical unit or PLU while the BIND receiver is known as the secondary logical unit or SLU.

For any session to be established, the location and characteristics of each resource (source and target) must first be known. The search procedure is a part of the directory services component of a Network node. Its function is to find the location of the target resource of a session request. The resource locations are dynamic. The ability of the directory search procedure to find the current location of a target resource enables session services to direct its session establishment flows (BINDs). The location and characteristic information can be stored in directories at the End nodes, Network nodes and central directory node. Like a gateway node, a central directory node is a special Network node. A central directory node has a large cache directory for storing information about resources located throughout the network. Every node has a local directory containing information about its own resources. In the case of a Network node, the local directory, sometimes referred to as a domain directory, contains information about resources at the Network node and resources at each of the End nodes served by the Network node. A Network node also typically has a cache or cross domain directory containing information about resources located elsewhere in the network or in other networks connected through gateway nodes.

Cache entries may be accumulated in different ways. One way is to load the cache directory with resource information when the system or network is initially being defined. Another way is to retain the results of earlier search or LOCATE operations. It must be recognized that cache entries initially provided during system definition may be altered or even deleted as a result of subsequent LOCATE operations. It must also be recognized that a LOCATE operation may result in an addition of a resource to a cache directory where that resource did not exist at the time of system definition.

LOCATE operations are performed using LOCATE messages transmitted using a SNA basic link unit or frame. Each frame includes a Data Link Control or DLC header, a Transmission Header or TH, a Request/Response Header or RH, a Request/Response Unit or RU and a DLC trailer. Briefly, the DLC header and DLC trailer are used to control the transmission of the frame between two adjacent nodes over the particular physical media connecting those two nodes and to recover from any errors that might be introduced during transmission while the Transmission Header contains source and destination address information and other path control information needed to transmit the frame along a multi-node path. The Request/Response Header contains control information related to the following Request/Response Unit, which defines the type of Request or Response being made in the frame. Further details about each of the fields in a frame may be found in the references mentioned earlier.

This description may, from time to time, refer to a LOCATE request frame or a LOCATE reply frame. It should be kept in mind that there is no special frame and that the reference is just a brief way of referring to a conventional frame that happens to contain a LOCATE request or a LOCATE reply.

A SNA frame can carry a LOCATE request or LOCRQ generated to search for a network resource. The unique portion of the LOCATE request is the Request/Response Unit field which identifies the frame as a LOCATE request frame. This may includes a VNR or Verify Not Required field or flag needed for practice of the patented invention, U.S. Pat. No. 5,222,242 entitled "System for Locating a Node Containing a Requested Resource and for Selectively verifying the Presence of the Resource at the Node" issued Jun. 22, 1993 to Choi et al. hereby incorporated by reference, which may be used with the present invention. The Verify Not Required flag is an indication to any Network node receiving the LOCATE request frame that the location and characteristics of a target resource do not necessarily need to be verified by forwarding the request to the node which owns the target resource. In the case of the present invention, however, it is preferable to have verification of the location of the target resource.

The Locate request may also include a Bypass field or flag in accordance with one embodiment of the invention. The Bypass Flag may be used with or without the VNR flag. The Bypass flag if set informs the node handling the Locate Request that a Unavailable Resource Table (URT) check should not be performed. Use of the Bypass flag is discussed in detail below.

The SNA frame suitable for a LOCATE Reply is unique in that it includes a Request/Response Unit containing information about the target resource and may contain a Verify Not Performed or VNP flag. If the Verify Not Performed flag is set in the LOCATE reply, any node receiving the LOCATE reply will know that the location and characteristics of the target resource were not verified before the LOCATE reply was generated by a Network node.

OVERVIEW OF NETWORK SEARCH OR LOCATE PROCEDURE

Figure 2:
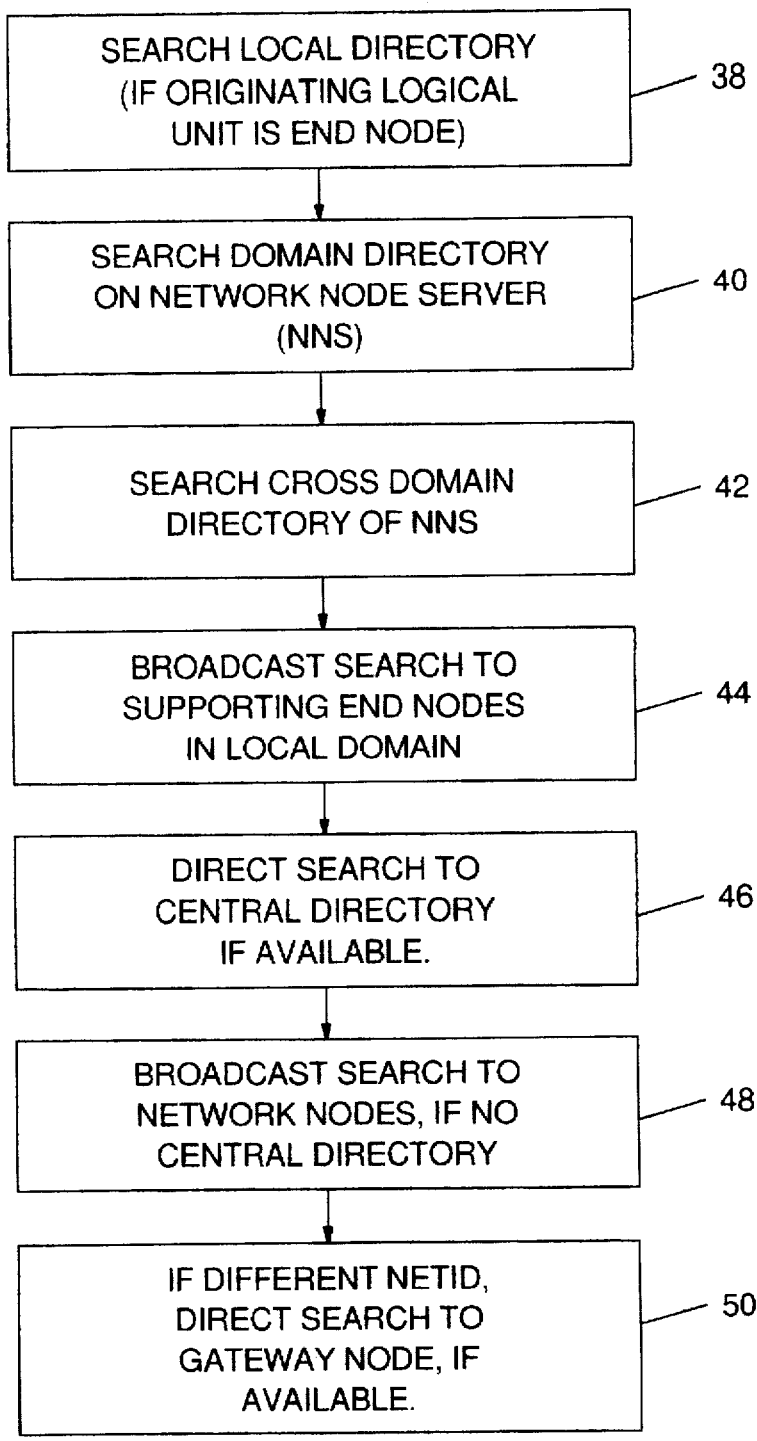
FIG. 2 is a high level flow chart of a LOCATE process.

The objective of the network search procedure, herein called the LOCATE procedure is to locate resources (e.g., LUs, network users, resources, etc...) in the network so that a session can be established between the source (or originating) resource and the target resource. Once the location of the target resource is known a route can be computed to the target resource by route selection services. Session services then uses the path computed by route selection services to route its session establishment request (BIND). FIG. 2 is a high level flow chart of a LOCATE process. Basic LOCATE operations are taught in U.S. Pat. No. 4,914,571 referenced earlier.

An understanding of the LOCATE operations is important to understanding the benefits of the present invention and an overview is provided below. If a LOCATE request is originated by a resource located at an End node, the initial operation in the LOCATE process is operation 38 in which the End node searches its local directory for information about the target resource identified in the LOCATE request. Each End node contains information only about its own resources and is considered to be the owner of those resources.

Assuming the target resource is not at the same End node as the source resource, the LOCATE request is forwarded to the Network node server which provides services for the originating End node. In operation 40, the Network node server searches its domain directory for entries relating to the target resource. The domain directory includes entries for resources owned directly by the Network node and entries for resources known to be owned by the End nodes attached directly to the Network node. If an entry for the target resource is found in the domain directory, the serving Network node will, if appropriate, return a LOCATE reply directly to the originating End node.

If a target resource entry is not found in the domain directory of the originating Network node, the network server node for originating End node, that node then searches its cross domain directory in an operation 42 for cache entries relating to resources located in other domains. If the cross domain search reveals an entry relating to the target resource, a LOCATE reply may be returned to the originating End node, if appropriate. Otherwise, the originating Network node server may broadcast (in operation 44) the LOCATE request to each End node in its domain that is capable of supporting the LOCATE process. The LOCATE process does not require that this step be performed and in certain situations it is desirable to skip this step. Not all End nodes in any computer network necessarily have the same capabilities. Some End nodes, particularly older ones, may not support LOCATE operations and it would be futile to broadcast any such request to such nodes. If the target resource is found after a broadcast search to supporting End nodes in the domain, a LOCATE reply will be generated by the End node owning the resource, if appropriate.

If operation 44 fails to find the target resource in the domain or is skipped, the search is directed to the central directory node in an operation 46, assuming a central directory node has been defined in the network. If the central directory node has a cache entry for the target resource, it may return a LOCATE reply, if appropriate.

Assuming the target resource is not found in the central directory, the search or locate request is then referred to other CDs within in the network. Should the the CDs fail to have the target resource in their cache, the next operation 48 calls for the LOCATE search request to be broadcast to other Network nodes in the network. The broadcast operation is performed by the central directory node, if one exists. If no central directory node has been defined, the broadcast operation is performed by the Network node serving the node containing the source resource. A Network node receiving the broadcast search may return a LOCATE reply directly if it has a cache entry for the target resource, if appropriate.

If the target resource is not found by any of the Network nodes in the network as a result of the broadcast search, the LOCATE request may be forwarded to the second network through the gateway node in an operation 50. If a Network node in the second network that is connected directly to the gateway node has a cache entry for the target resource and if appropriate, that Network node generates a LOCATE reply and returns it to the originating Network node server in the first network through the gateway node. Otherwise, the LOCATE request is propagated through the second network in a series of operations similar or perhaps identical to those performed in the first network.

Note that with the present invention it is preferable that the originating node or server NN verify the location of a target resource before providing the source resource with an indication that the target resource has been located. This verification may be done using a directed search procedure as specified in U.S. Pat. No. 4,914,571 referenced above. This permits the server NN a level of assurance that the target resource has been truly located. The server NN can then update the Unavailable Resource Table (i.e., deleting the entry for the found target resource) with the a high level of assurance that the target resource is located.

When a search fails, the LOCATE reply carries a sense code value indicating the cause of the failure. When a broadcast has been sent, multiple replies will be received, several of which may be negative. The sense code values are hierarchically related in that once a negative reply is received with a higher failure type than the previous type, the search failure is promoted to the new higher type. Thus, at any given time the search origin retains only one sense code for a given search. The sense codes also permit the server NN to determine whether the target resource is busy or whether the target resource is unavailable.

REDUCING NETWORK LOCATION TRAFFIC

The present invention can reduce network location traffic in variety of ways when used with the network search or locate procedure. In the preferred embodiment the present invention performs an Unavailable Resource Table (URT) check prior to the network server node performing step 40 as shown in FIG. 2. In an alternative embodiment the check for a previous network search is performed by the server NN after the server NN has searched its own domain. However, the present invention can be implemented before or after the server NN domain search. The check may be also be performed before or after any of the steps shown in FIG. 2. In general the present invention can be implemented at any level or multiple levels in the network (i.e., by Logical Unit (LU), EN, NN, Central Directory (CD), or Gateway Node (GN)). Implementation on the server NNs before any searching is the preferred embodiment of the present invention. The URT, unavailability period and search threshold mechanisms are described in detail below.

UNAVAILABLE RESOURCE TABLE (URT)

Using the present invention each node (or only server nodes or a subset of nodes or all resources) maintains an Unavailable Resource Table (URT). The URT contains information on resources that were the target of previous searches for which the resource was unavailable, unreachable or unlocatable (i.e., the resource cannot be found or located in the network). The term unavailable as used herein means that the location of the resource could not be determined. If the resource is located but busy because it is servicing other requests or is in use or allocated, that resource is not considered unavailable as used in connection with the present invention. It is important to note that entries are created in the URT only when the location of the resources cannot be found or is not known. Whether the resource is unavailable or is located but in use can be determined from the results of the network search (i.e., in an SNA network it can be determined from Locate replies specifically the sense codes).

URTs for several embodiments of the present invention are shown in FIG. 7. The URT contains entries for resources that previously could not be located. As shown in FIG. 7(c) a sample entry for the URT contains a resource identifier for the resource that was not located, an unavailability period and a search threshold. The resource identifier is a representation of the target resource that could not be located. This resource identifier is provided in the locate request or target resource request received by the server NN. The Unavailability Period portion of an URT entry permits the server NN to prohibit search for the resource identified in the resource identifier portion of the entry during the unavailability period. The search threshold portion of the URT entry allows the server NN to allow searching for a target resource even though the unavailability period has not expired, provided a number of requests for the target resource have been received. The Unavailability Period and Search Threshold portions (or fields) of the URT entries are described in detail below.

The URT may be included with other network specific data such as a directory services table or a cache or it may be a separate stand alone table. Although referred to throughout the specification as a table, this is meant only to provide a logical view of the information required by the present invention. The physical implementation of the URT may be a file, block, directory, data object or any other physical data structure. The physical characteristics of the data structure in no way limit the present invention. The URT may also be implemented using a relational or object-oriented database. The purpose of the URT is to maintain information on target resources for which previous network searches have failed. The URT, or the URT table extensions to a network directory, is used to reduce network location traffic associated with unavailable resources. The present invention uses two mechanisms in combination with the URT to reduce resource location network traffic. The present invention makes use of an unavailability period and/or a search threshold mechanism to reduce network resource location traffic. These two mechanism are described in detail below.

UNAVAILABILITY PERIOD MECHANISM

When, the originating node has initiated a network search for a target resource which is determined to be unavailable, the server NN (or originating node) starts a timing cycle interval during which subsequent requests for the target resource are automatically failed by the originating node without initiating the network search. The unavailability period is essentially a timer that is started with the first failed search request and which is set to expire after a certain period of time—the UNAVAILABILITY PERIOD. No network searches for the target resource are commenced by the server NN (or originating node) for the target resource during the UNAVAILABILITY PERIOD. Search requests received after the timer has been initiated but, before the end of the UNAVAILABILITY PERIOD, are automatically failed without commencing a search for the target resource in the network. Requests for the target resource received after the UNAVAILABILITY PERIOD has expired are permitted to generate network search requests.

The unavailability period mechanism may be implemented in a variety of ways. One way is to enter the time after which requests for the previously determined unavailable resource is permitted to cause network searches in the unavailability period field of the URT entry associated with the target resource (i.e., containing the resource identifier associated with the target resource). The time is entered into the URT entry, after the network search for the target resource has failed or been terminated or when a determination has been made that the target resource is unavailable. The time entered can be determined by adding the UNAVAILABILITY PERIOD, for the unavailable resource, to the current time and storing this future time in the unavailability period field of the URT entry associated with the target resource. The unavailability period field of the URT entry is then checked when a subsequent request for the same target resource is received by the originating node before a network search is commenced. When this check is performed, if the current time exceeds the time in the unavailability period field associated with the requested target resource or the unavailability period field is empty, then a network search is allowed to commence for the requested target resource. If the current time does not exceed the time in the unavailability period field then a network search is not commenced and a failed reply or request or resource unavailable message is returned to the requesting entity. The current time may be the time the request is received by the originating node or the time the URT is checked by the originating node or some other time.

The selection of the UNAVAILABILITY PERIOD, the time period for which subsequent requests for the same resource will be failed is a design decision which may be based upon the criticality of the resource, the expected frequency of requests for the resource and the expected or known availability period. Other factors may also influence the UNAVAILABILITY PERIOD. The UNAVAILABILITY PERIOD may be the same for all resources, vary for each class of resource, vary for each individual resource or vary for some other grouping of resources. The UNAVAILABILITY PERIOD for each resource, class of resource or resource grouping may also be supplied by a network management facility (e.g., such as the NetView Product available from IBM Corporation). The network management facility in its network management role may be able to provide accurate estimates as to how long a network failure or outage condition will last. This information could be based on collected statistics or information input to the network manager by human operators. The network manager could provide the originating node with the unavailability periods to use for resources, classes of resources, or resource groupings. Thus, if the network manager was aware that a particular portion of a network was scheduled to be unavailable for scheduled maintenance it could supply appropriate values for the UNAVAILABILITY PERIOD to the Network nodes. If the UNAVAILABILITY PERIOD information is stored in a table at the originating node the network manager could update the table as required. Note that the unavailability table is separate and distinct from the URT. The unavailability period table would contain information on the periods of time a resource, class of resource or grouping of resources should be made unavailable after it is determined to be unavailable (or the amount of time to add to the current time in unavailability period portion of the URT). The network manager update could be dynamic so as information is provided to the Network Manager it is updated in the unavailability table. The originating node could then update the URT, if desired. When creating or updating entries in the URT the originating node would read the from the unavailability period table for the resource, class of resource, or resource grouping associated with the target resource and use this information in updating or creating the URT entry. The Network Manager could update the table and this information could then be used by the Network node so that more efficient unavailability periods are used.

SEARCH THRESHOLD MECHANISM

When, the originating node has initiated a network search for a target resource which cannot be found or is unavailable, the originating node may initialize a counter which is updated when subsequent requests for the target resource are automatically failed by the originating node without initiating the network search. Like the Unavailability Period, the search threshold is a mechanism that is utilized after a network search has been unable to determine the location or availability of a requested target resource. Essentially the search threshold operates as a counter. It tracks the number of requests made for a target resource after a network search for the target resource has failed or terminated. When this count exceeds a THRESHOLD set for the target resource then another network search can be commenced for the target resource. The THRESHOLD value is the number of subsequent requests for the resource that will be automatically failed before a network search for the target resource is initiated or allowed to commence. If the THRESHOLD is not exceeded then the subsequent request is automatically failed without initiating a network search for the target resource and the threshold count is incremented. The search threshold provides a threshold counter which is incremented each time a search for a specific resource is automatically failed.

The search threshold mechanism may be implemented in variety of ways in addition to that described above. One way is to have a search threshold field (i.e., threshold counter) associated with each entry in the URT. After a network search for the target resource has failed, zero is entered in the search threshold field of the URT entry associated with the target resource. This search threshold field of the URT entry associated with the target resource is then checked when a subsequent request is received for the target resource but, before another network search is commenced for the target resource. If the search threshold (i.e., threshold counter) for the target resource exceeds the THRESHOLD (or is equal to the THRESHOLD in another variant) then a network search is allowed to commence. If the threshold counter is less than or equal to the THRESHOLD (or less the THRESHOLD in another variant) then a network search is not allowed to commence and the locate request is automatically failed and the threshold counter is incremented. The THRESHOLD may also be stored in a field in the URT. Another way the threshold counter can be implemented is by initializing the search threshold portion of the URT entry with the THRESHOLD for the target resource and decrementing it each time a locate request is automatically failed. In this embodiment the network search is only commenced when the threshold counter field is zero.

As with the UNAVAILABILITY PERIOD the selection of the actual value for the THRESHOLD (i.e., the number times a locate request for a target resource is automatically failed before initiating a network search for the target resource) may depend on the criticality of the resource, the number of resources, the expected frequency and timing of requests for the resource and the expected or known availability period. Other factors may also influence the selection of the THRESHOLD. The THRESHOLD for each resource, class of resource, or resource grouping may also be supplied by a network management facility (e.g., such as the NetView Product available from IBM Corporation). The network management facility in its network management role may be able to provide accurate estimates as to how often a resource is requested or a failure or outage condition will last. This information could be based on collected statistics or information input to the network manager by human operators. The network manager could provide the originating node with the THRESHOLDS to use for resources, classes of resources or resource groupings. Thus, if the network manager was aware that a particular portion of a network was scheduled to be unavailable for scheduled maintenance it could supply appropriate values for the THRESHOLDS to the Network nodes. If the THRESHOLD information is stored in a table at the originating node the network manager could update the table as required. This update could be dynamic so as information is provided it is updated in the THRESHOLD table. The originating node could then update the URT if desired. When creating or updating entries in the URT the originating node would read the THRESHOLD from the THRESHOLD table for the resource, class of resource, or resource grouping associated with the target resource and use this information in updating or creating the URT entry.

UNAVAILABILITY PERIOD AND SEARCH THRESHOLD MECHANISM

The unavailability period and search threshold mechanisms may be combined. The unavailability period mechanism if used alone can create some difficulties for high demand or critical resources. The search threshold mechanism if used alone also creates problems for resources with low demand resources. Combining the search threshold with the unavailability period alleviates possible difficulties that can be caused for high demand resources with just the unavailability period mechanism alone and for low demand resources used with the search threshold mechanism used alone. The two mechanisms may be combined such that after the originating node has initiated a network search for a target resource which cannot be found or is determined to be unavailable, the originating node initializes both an unavailability period field and a search threshold field of an entry in the URT. A new network search is performed when either the unavailability period expires or the threshold counter exceeds the THRESHOLD. This results in a significant conservation of networks resources especially when parts of the network are failed or down for maintenance or repair. After an initial determination of unavailability for a target resource a network search is permitted to commence when either the unavailability period expires or the threshold counter exceeds the THRESHOLD. The Unavailability period table and THRESHOLD table as described above could easily be combined into a single table. These two mechanism have been described in detail above.

Another benefit of combining the two mechanism is that if the UNAVAILABILITY PERIOD is too long or the target resource becomes available earlier than expected no requests are permitted to be sent to the target resource until the unavailability period expires. This results in an available but unused resource. For critical resources this down time is expensive and creates an unnecessary backlog. The threshold mechanism when combined with the unavailability period eliminates or minimizes this time, particularly with respect to high demand resources. After the threshold is met a network search would find the target resource and the target resource would be removed from URT. Therefore, the target resource would be put in use before the unavailability period expired. Similarly, for low demand resources using only the search threshold mechanism the resource may become available long before the THRESHOLD is met.

Figure 3:
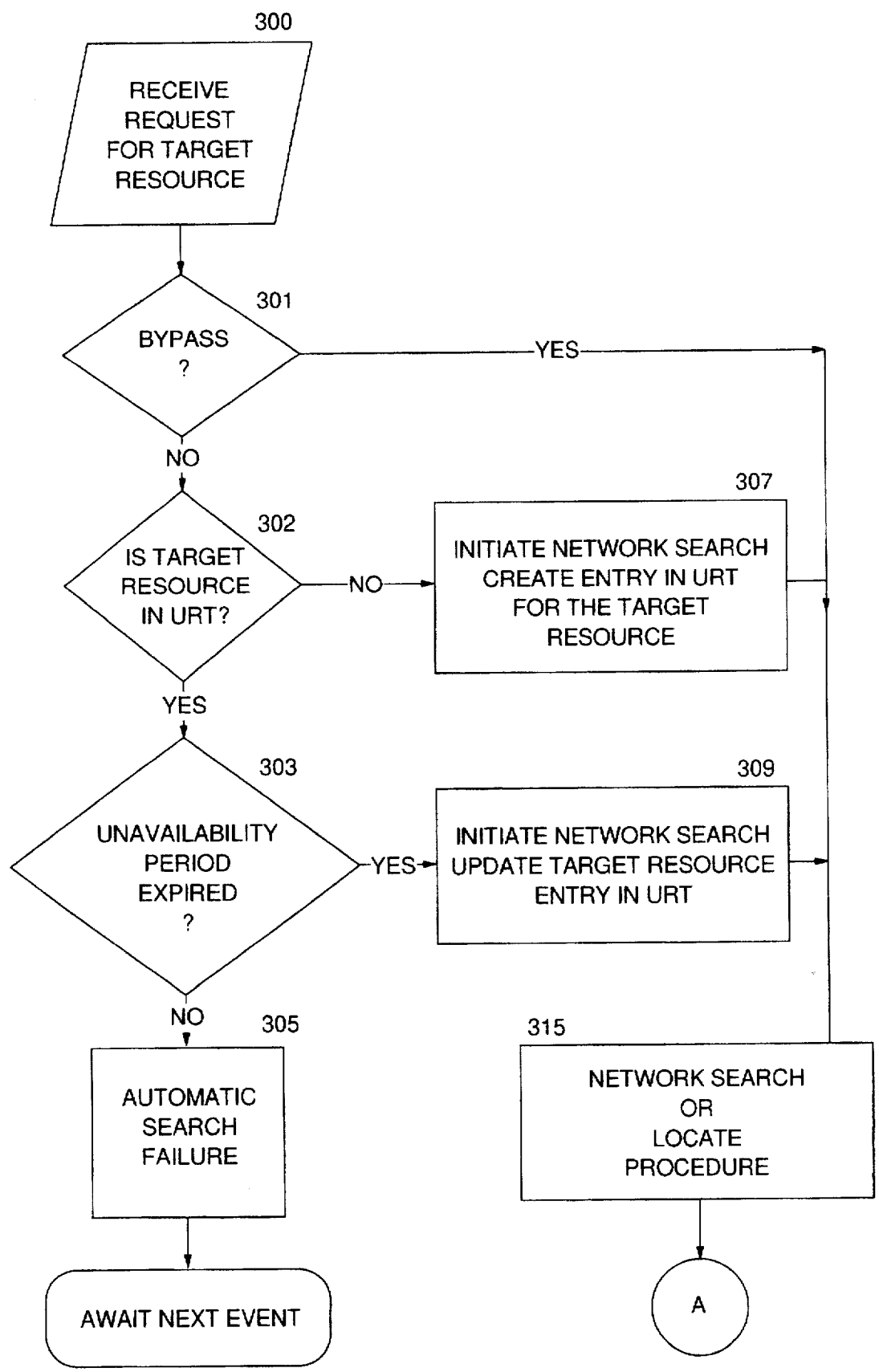
FIG. 3 is a flow diagram depicting one embodiment of the present invention using the unavailability period mechanism to reduce resource location traffic in a network.
Figure 4:
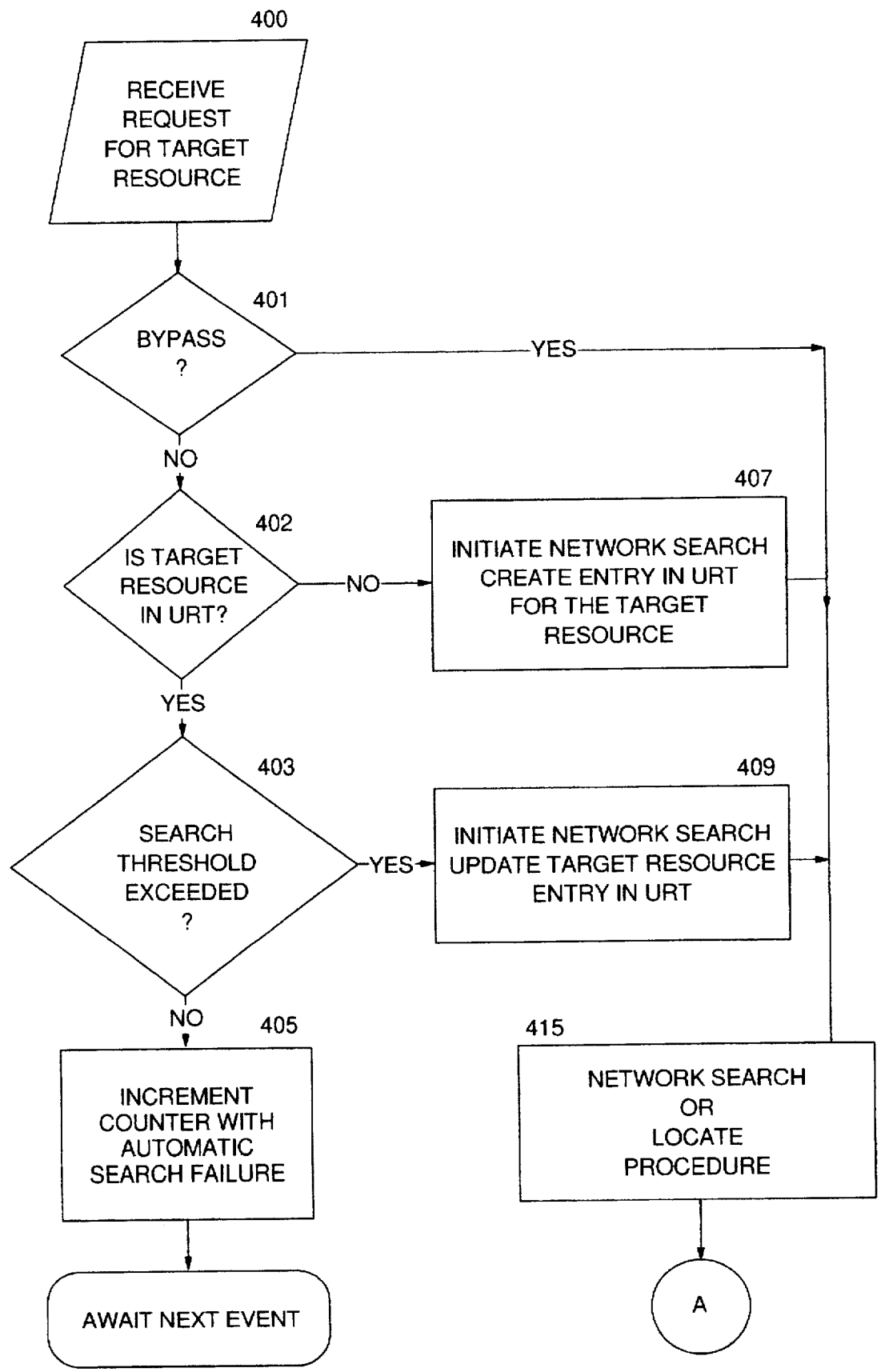
FIG. 4 is a flow diagram depicting one embodiment of the present invention using the search threshold mechanism to reduce resource location traffic in a network.
Figure 5:
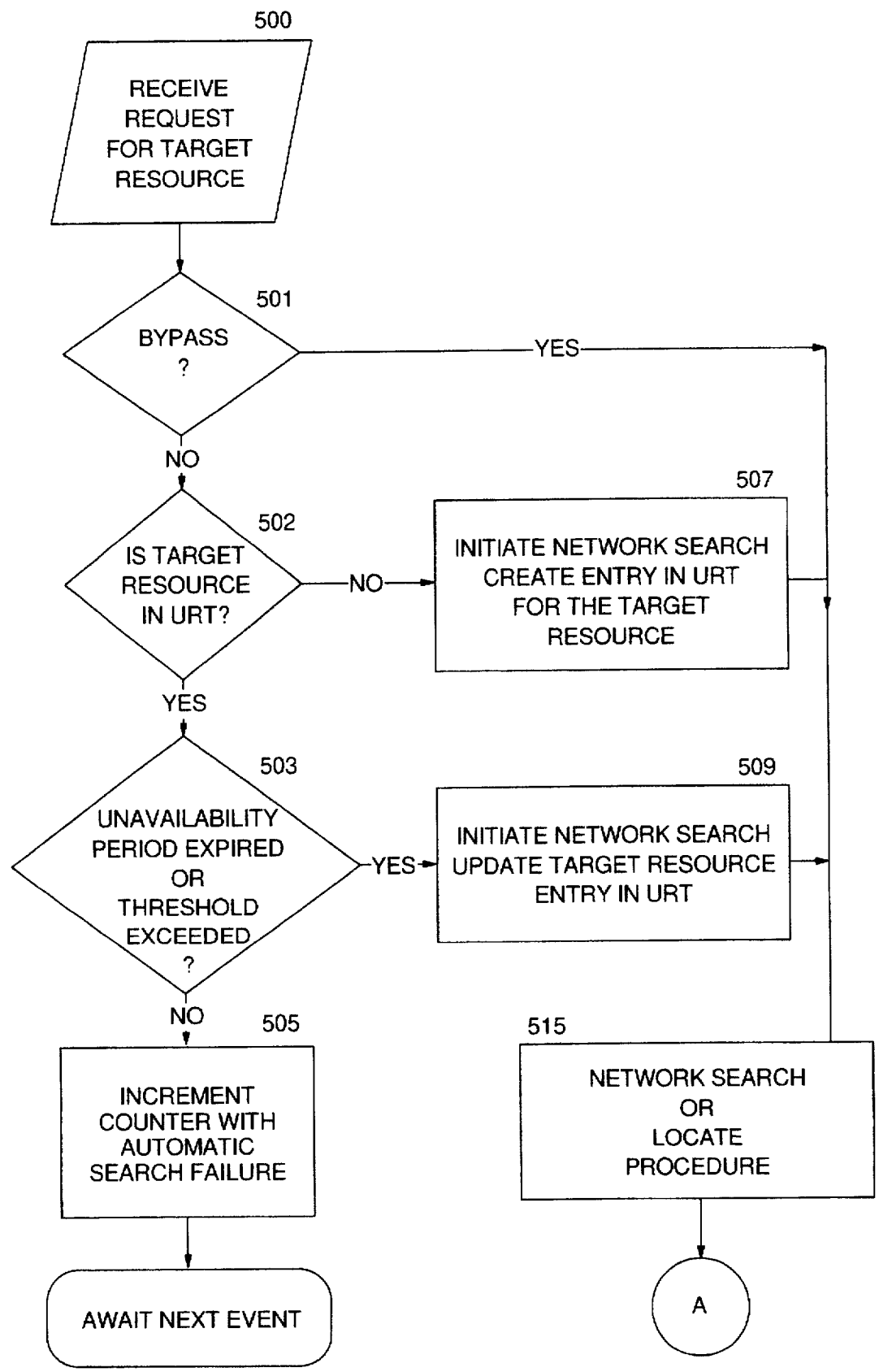
FIG. 5 is a flow diagram depicting one embodiment of the present invention using the unavailability period and the search threshold mechanisms to reduce resource location traffic in a network.

FIG. 3 is a block diagram depicting one embodiment of the present invention using the unavailability period mechanism to reduce resource location traffic in a network. FIG. 4 is a block diagram depicting one embodiment of the present invention using the search threshold mechanism to reduce resource location traffic in a network. FIG. 5 shows the preferred embodiment of the present invention using the unavailability period and the search threshold mechanisms to reduce resource location traffic in a network. The preferred embodiment shown in FIG. 5 is used to illustrate the present invention.

Prior to step 501, the server NN has received a request 500 for a target resource from an originating resource or from the originating resource's EN. This request may be a locate request, session establishment request or some other type of request. When a resource desires network services (i.e., a session, to send a message, locate a resource, etc.) it requests this via programming interface (API). The API provides an interface to the network functions.

In response to the request 500 but, before initiating a network search for the target resource the server NN determines whether a previous network search has failed for the target resource. In the preferred embodiment of the present invention this is done by checking a URT at the server NN to determine if an entry had been previously made for the target resource.

Before checking the URT as shown in step 502 the present invention may also include step 501. In step 501 a special flag or indicator contained in the request is checked to determine if the URT check should be bypassed. If this bypass flag in the request is set to bypass then the URT check is not performed and a network search or Locate procedure is carried out as shown in step 515. If the flag is not set to bypass then the URT check is performed as described below. Bypassing the URT check may result in better performance in certain instances such as where a request is received to determine the availability of a particular resource. For instance, when a server NN has a URT entry for a target resource that has expired, the server NN needs to determine if the target resource is "truly unavailable" (i.e., not unavailable by virtue of any other node's URT check). That is the server NN does not want another intermediate node through which the search or locate request is being routed to automatically fail the search request because of the intermediate nodes own URT check. Thus, the bypass flag allows for bypassing URT check when it is desirable.

As shown in block 502 the server NN checks the URT for an entry corresponding to the target resource. A sample URT is shown in FIG. 7(c). As was stated above the physical implementation of the URT is not important to the present invention.

If a previous network search for the target resource was not performed, then the target resource is not in the URT and a network search is initiated in block 507. The network search or locate procedure is then implemented in 515. If a previous network search has been conducted, and has not been previously deleted from the URT, then an entry for the target resource in the URT exists and in block 503 the UNAVAILABILITY PERIOD and SEARCH THRESHOLD values associated with the target resource are read from the URT. If either the UNAVAILABILITY PERIOD has expired or SEARCH THRESHOLD value has been exceeded as determined in 503 then a network search is allowed to commence as shown in block 509. Blocks 507 and 509 are shown separately but, essentially provide the same function; that is, initiating a network search. With Block 507 no entry in the URT is found for the target resource. With Block 509 an entry is found in the URT but the entry has expired. In order to prevent other network searches from commencing for the same target resource before the results are determined for the current search block 509 updates the existing entry and block 507 will create an entry for the target resource in the URT.

Along with commencing the network search in block 509 the target resource entry may be updated or marked (or in some embodiments deleted) in the URT. Along with commencing the network search in block 507 the target resource entry may be created (or in some embodiments not created) in the URT. The server NN may update or mark the URT entry for the target resource before initiating the network search to prevent other requests for the same target resource from being initiated while the initiated search is in progress. Thus, the URT keeps track of network searches it has initiated for target resources so that requests from other resources for the same target resource may be automatically failed while the network search is conducted. This may require that the URT entry be removed when and if the network search finds or locates the target resource and it is available (it is determined to be not unavailable). Other mechanisms may be used by the server NN to avoid two or more overlapping searches from the same NN.

In an alternative embodiment to updating the URT entry after checking the URT for and finding a target resource that has expired, the entry may be deleted from the URT (in the case where no entry is found no entry would be created). However in this embodiment, after the entry is deleted a subsequent request for the same target resource, received before the results of the initiated search are available, will not find an entry in the URT for the target resource. Thus, the URT check is clear. If prevention of overlapping searches for this target resource is desired another check is required to prevent this subsequent request from initiating another network search for the target resource. Such a check to make sure no searches are pending for the target resource might be made by examining the control blocks in the server NN.

Note that in the preferred embodiment shown in FIG. 5 both the UNAVAILABILITY PERIOD and SEARCH THRESHOLD techniques are utilized. FIG. 3 and FIG. 4 demonstrate embodiments of the present invention using only one of the mechanisms respectively. The implementations of these other embodiments is basically the same as discussed with exception that only one condition rather than either condition needs to met in order to suppress a network search. Of course, with the embodiments of FIG. 3 and FIG. 4 only the appropriate fields are needed for the target resource in the URT as shown in FIG. 7(a) and FIG. 7(b) respectively.

Returning to FIG. 5, if in block 503 the UNAVAILABILITY PERIOD has not expired and the SEARCH THRESHOLD has not been exceeded then a network search is not commenced and a failed search response is provided to the originating resource. A failed locate request, reply or other message is provided to the originating or source resource indicating that the search has failed. When a network resource desires network services (i.e., a session, to send a message, locate a resource, etc.) it requests this via programming interface (API). The API which interfaces to the network functions. Part of the API definition specifies the feedback to be returned to the originating resource when a request can not be successfully completed. Note that after a network search is initiated the results of the network search may be used to update the URT. Updating the URT is described with respect to FIG. 6 which starts at terminator A as shown on both FIG. 5 and FIG. 6.

UPDATING THE URT

Figure 6:
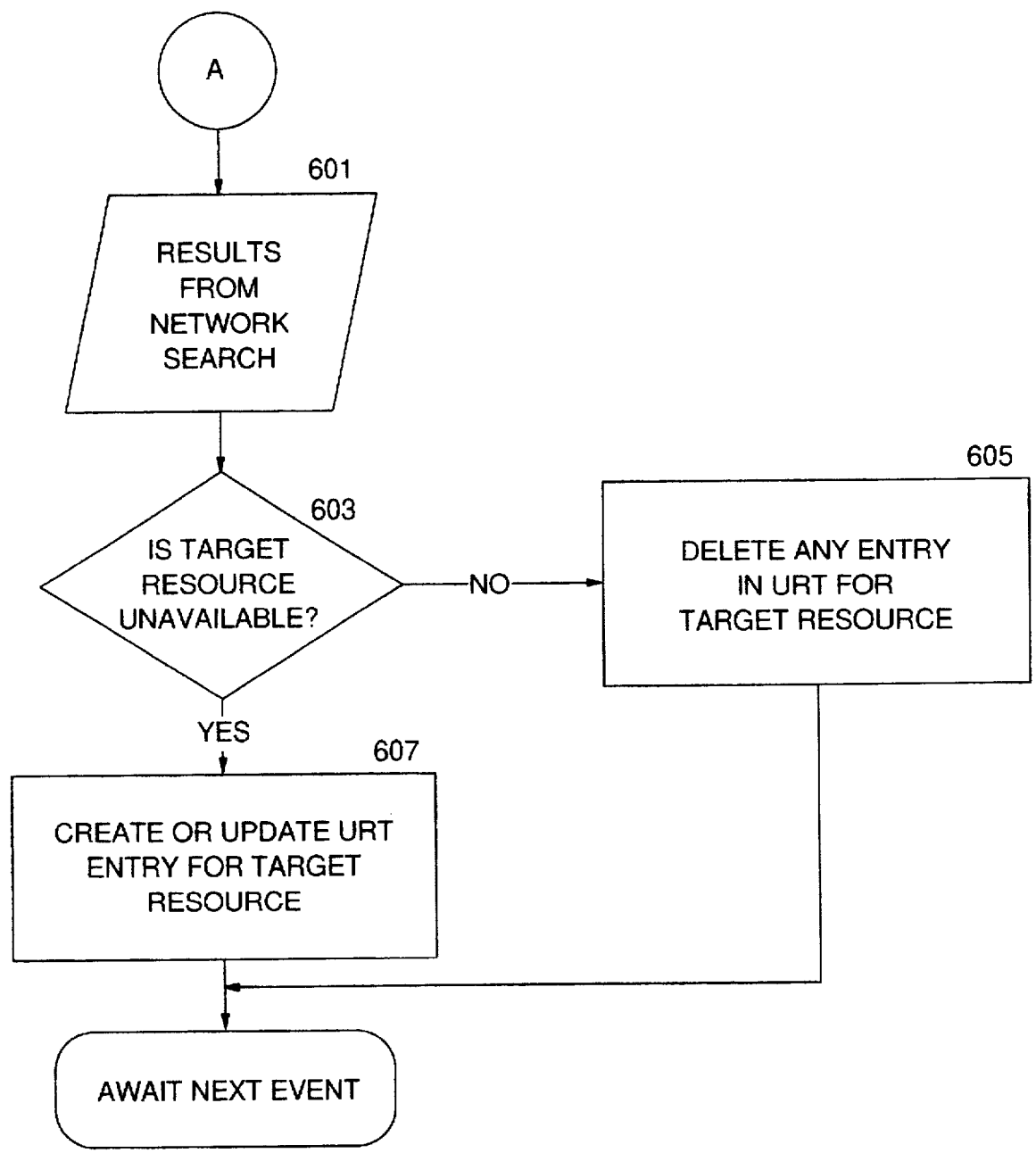
FIG. 6 is a flow diagram depicting processing of the network search results in accordance with one embodiment of the invention.

FIG. 6 demonstrates the server NN processing specifically required by the present invention to keep the URT up-to-date in accordance with the present invention. The steps shown in FIG. 6 are in addition to any caching the server NN might perform in response to search results. After a network search is commenced, either from block 507 or block 509, the server NN will be able to determine whether the target resource is unavailable, unreachable or unlocatable. The server NN may receive one or more responses or replies 601. From these responses the server NN determines whether the target resource is unavailable. As mentioned earlier the server NN will not permit entries in the URT for target resources that are busy (target resources where the location is known but the resource is not available because of use or some other reason or characteristic). In block 603 the server NN makes a determination as to whether the target resource is unavailable. If the target resource has been located then the server NN may have housekeeping functions to perform such as deleting the entry for the target resource in the URT as shown in 605. Block 605 may also entail notifying the originating resource or EN and possibly attempting to establish a channel or session. Notification of the originating resource may have already been done by the network search procedure as shown in element 515 of FIG. 5.

In the preferred embodiment of the present invention if the target resource is determined to be unavailable then nothing further is required. This is because the target resource was unavailable as determined in step 603 based on the network search results and an entry in the URT for the target resource was created or updated in steps 507 and 509, respectfully as shown in FIG. 5. Recall that Steps 507 or 509 are one technique for preventing overlapping searches for the same target resource. Step 607, as shown in FIG. 6, is unnecessary if the entry for the target resource was either created in step 507 or updated in step 509 and the target resource was not found in step 603. However, Step 607 will notify the originating resource that the target resource could not be found.

In an alternative embodiment, if the target resource is unavailable, then the server NN may update the URT by creating or updating (if necessary) the URT entry for the target resource with appropriate values for the UNAVAILABILITY PERIOD and SEARCH THRESHOLD fields associated with the target resource entry. This is shown in block 607. Block 607 will also entail providing a failed search response or failed locate request or reply message to the originating resource. The particular creating, updating and deleting required in blocks 605 and 607 will depend on what the server NN does in steps 507 and 509 as discussed earlier.

When the server NN updates or creates a URT entry for an unavailable target resource it may obtain the particular values for the UNAVAILABILITY PERIOD and the SEARCH THRESHOLD values in a number of different ways. For instance, if the unavailable target resource is a member of a particular class or group of resources the server NN may update the fields with class or group values assigned for the particular class or group of resources. The values may themselves be stored in a separate table having resource class or group types and the values for the unavailability period and search threshold. As with the URT the physical structure of this table is not important to the present invention. This table may be included with other network specific data such as a directory services table, URT, caches or it may be a stand alone table. Although, referred to throughout the specification as a table, this is meant only to provide a logical view of the information required by the present invention. The physical implementation of the Table may be a file, block, directory, data object or any other physical data structure. The physical characteristics of the data structure in no way limit the present invention. The table may also be implemented using a relational or object-oriented database and included along with the URT. The purpose of the table is to maintain information on the unavailability periods and search thresholds values that are used in creating and updating URT entries.

If space for the URT entries exceeds the space allocation then the update mechanism may search through the URT and delete any expired or exceeded entries. These expired entries would not otherwise be deleted until a network search found the entry.

NETWORK NODE SERVER

Figure 8:
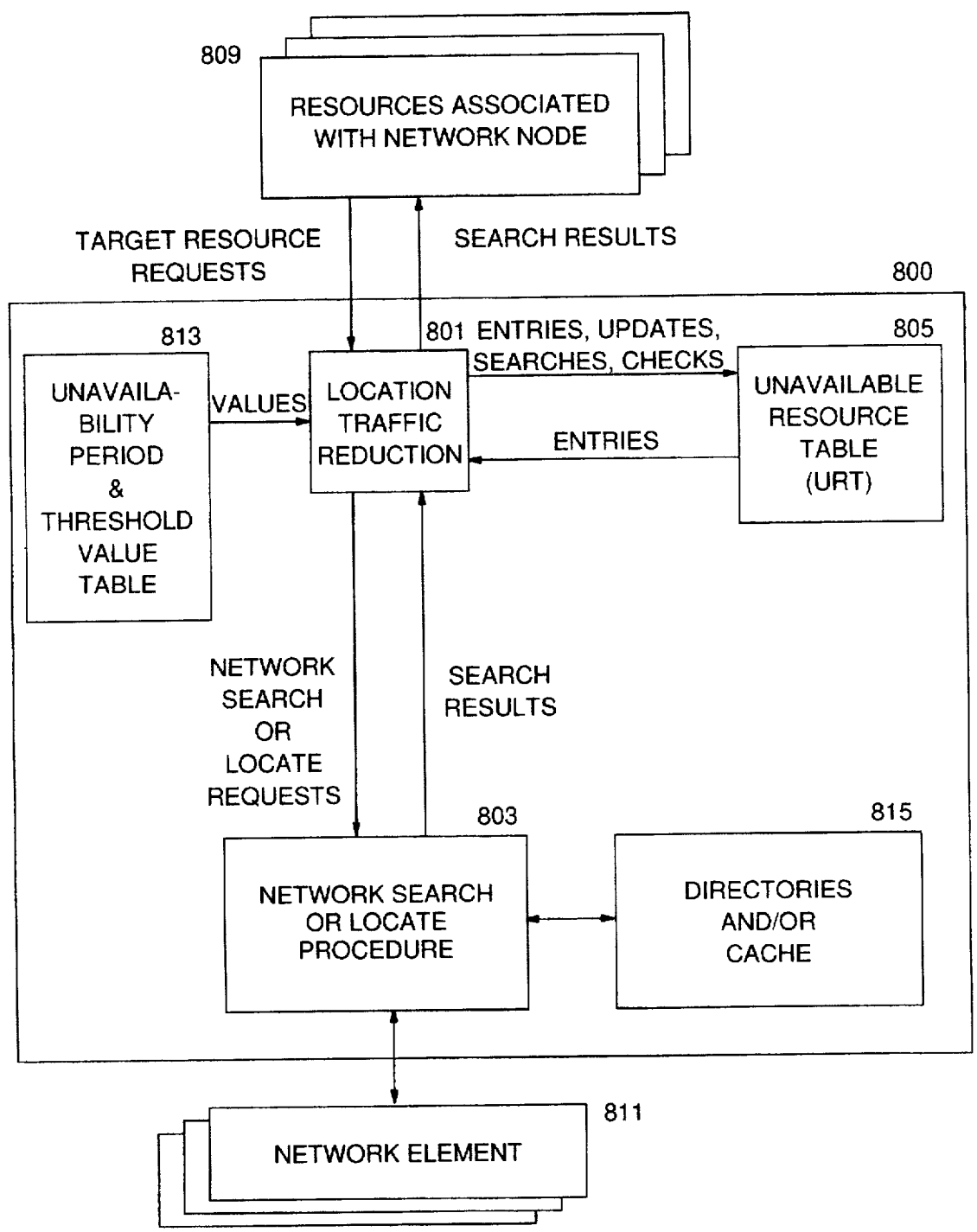
FIG. 8 is a block diagram depicting a server NN

FIG. 8 depicts a server NN configured for carrying out the preferred mode of the present invention. The server NN is a data processing system 800 with the required software systems for carrying out the present invention. The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function or collection of functions, which can be added to an existing computer system to provide new function to that computer system. Software systems generally are constructed in a layered fashion. In a layered system, a lowest level software system is usually the computer operating system which enables the hardware to execute software instructions. Additional layers of software systems may provide, for example, communications and networking functions, or database or graphical user interface or window management system capabilities. These software systems provide a foundation on which additional software systems can be built.

A software system is thus understood to be a software implementation of a function which can be assembled in a computer or data processing system providing new functionality. Also, in general, the interface provided by one software system to another software system is well-defined. It should be understood in the context of the present invention that delineations between software systems are representative of the preferred implementation. However, the present invention may be implemented using any combination or separation of software systems.

Figure 9:
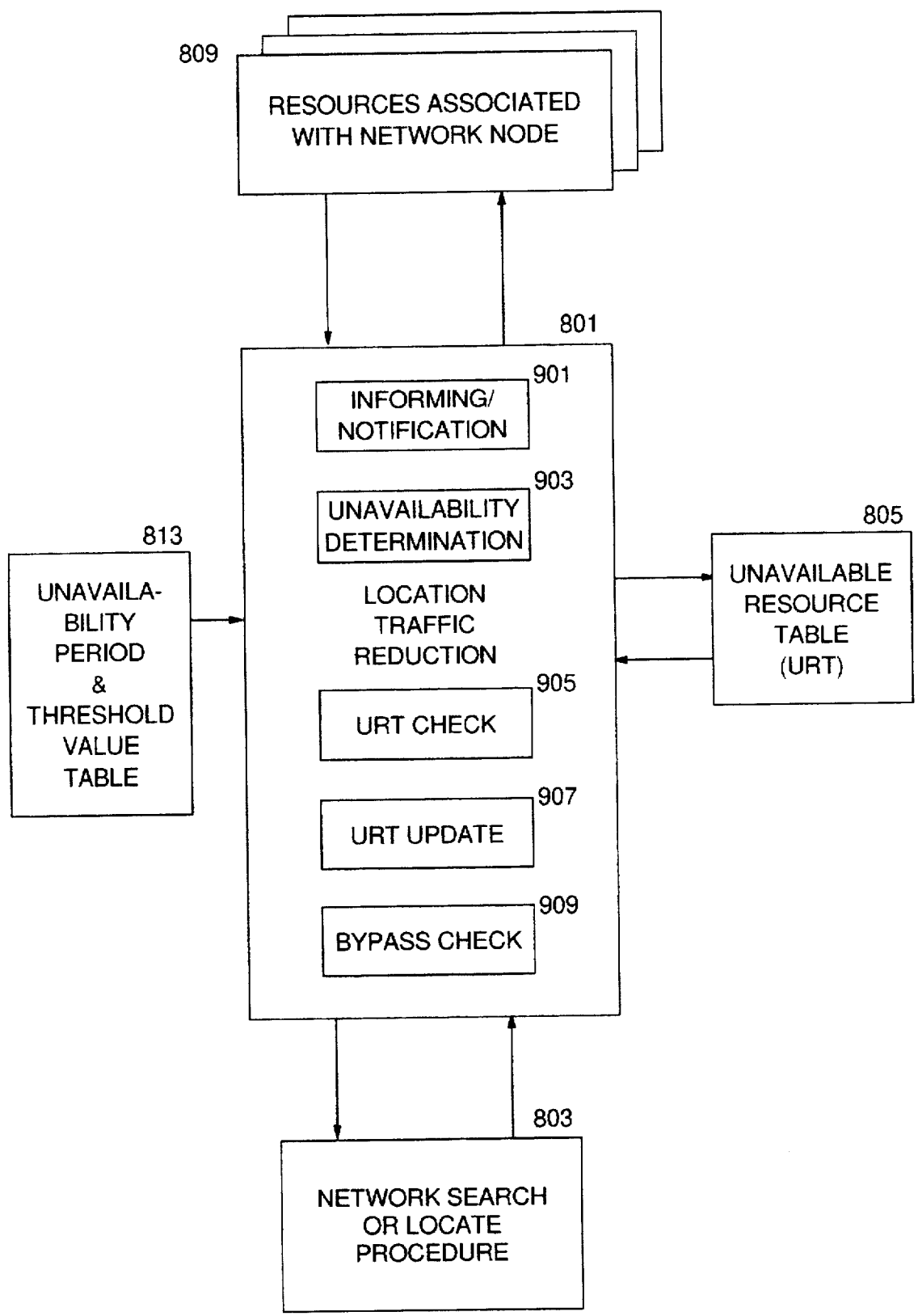
FIG. 9 is a block diagram depicting the functions used by one embodiment of the present invention.

As shown in FIG. 8 the resources and/or ENs associated with the server NN provide are shown as blocks labeled 809. These resources provide the server NN with target resource requests. These requests are communicated to the server NN 800 via some communications software system via some communications media and most likely enter through a port or adapter card in the server NN. These target resource requests may also be generated by software systems in the server NN 800. The server NN 800 receives these requests and notifies the Location Traffic Reduction means (LTR) 801. The LTR 801 is a collection of functions and for purposes of this discussion is considered a software system. The LTR and its associated functions are shown in FIG. 9. However, each function may also be considered a software system. None, some, or all of the LTR functions may also be implemented in hardware.

After receiving a target resource request the LTR 801 then processes the request. The LTR 801 may check a bypass flag in the request. If the bypass flag is set the LTR 801 will bypass the URT check and initiate or continue the network search. For each request the LTR 801 checks whether a previous network search was conducted, provided either the bypass flag is not set or the bypass check is not performed. This URT check is done by the LTR 801 checking the URT 805 for an entry that contains a representation of the target resource in the resource identifier field of any entry in the URT. The target resource identifier can be obtained from the request itself. How this check function is implemented will depend on the physical structure of the URT. For instance, if the URT is stored in a relational database table then a simple query is used to find or select entries having the target resource identifier in the resource identifier field of the entry. If a flat file is used then the check may look at each entry until the appropriate entry is found or all entries have been checked. Indexing may be used to expedite searching of the URT. Thus, the check function may make use of any search technique and accompanying data structure.

If an entry is found in the URT 805 the LTR 801 then determines whether the target resource is unavailable. The LTR 801 makes this determination based on the unavailability period and search threshold values as discussed above. If the LTR 801 determines that the target resource is unavailable then a network search is not required and the LTR informs the requesting or originating resource that the target resource request has failed. This is an automatic search failure. The search threshold is updated accordingly in the URT 805. If an entry for the target resource is found but either the unavailability period is expired or the search threshold is exceeded then the LTR updates the corresponding entry in the URT with appropriate values obtained form the UNAVAILABILITY PERIOD and SEARCH THRESHOLD table 813. If an entry for the target resource is not found then the LTR 801 creates an entry for the target resource in the URT 805 using appropriate values obtained form the Unavailability period and search threshold table 813.

The LTR 801 initiates a network search for the target resource based on either the determination that the target resource was not unavailable by the determination function or that no entry was found in the URT 805 for the target resource by the check function or that the URT check should be bypassed by the bypass check function. The Network Search function or Locate function 803 carries out the network search. As shown in FIG. 8 it may consult one or more directories or caches and forward requests to and receive replies from other network elements 811. A network elements may be an LU, EN, NN, server NN, CD or GN. When the search results are obtained from the network search function 803 the LTR 801 (or the Network search function 803) processes the results/replies to determine if the target resource is unavailable. Based on this determination the LTR 801 updates the URT 805 accordingly and either the LTR 801 or the Network search function 803 informs the originating resource of the search results as appropriate. The LTR 801 acts as a filter for the Network search function 803. The LTR 801 limits the number of network searches initiated by a server NN. By limiting the number of network searches the LTR 801 reduces resource location network traffic.

The LTR 801 is preferably located in the memory of the server NN. The LTR 801 is preferably an event driven software system responding to target resource requests and network search results. The LTR 801 performs the method as described in FIGS. 3–6. The URT 805 may also be loaded into the memory of the server NN or it may be run from disk or DASD associated with the server NN. The Network search function is also a software system preferably loaded into memory.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. In a computer network which includes a plurality of nodes, each node having interconnections between neighboring nodes, the plurality of nodes having at least one server node, each server node having one or more associated resources and a URT, each URT capable of containing entries, each entry having a resource identifier, unavailability period and a search threshold, a method for reducing network resource location traffic comprising the steps of:

checking the URT of a first server node for an entry having a resource identifier that contains a representation of a target resource, in response to a request for the target resource from a source resource associated with the first server node;

determining that the target resource is unavailable if the unavailability period of the found entry has not expired and the search threshold of the found entry has not been exceeded, if an entry is found in the URT;

informing the source resource that the target resource is unavailable and updating the search threshold of the found entry in the URT, if the target resource is determined to be unavailable;

initiating a network search for the target resource, if no entry was found in the URT or if the target resource was not determined to be unavailable; and updating the URT based on the results of the network search, if the network search for the target resource is unable to locate the target resource and deletes any entry for the target resource if the target resource is located.

2. The method of claim 1 wherein the first node is a network server node.

3. The method of claim 1 wherein the updating step:

creates an entry in the URT of the first node for the target resource if the network search fails and no previous entry for the target resource exists;

updates the entry in the URT of the first server node for the target resource if the network search for the target resource fails and a previous entry for the target resource exists;

deletes the entry in the URT of the first server node for the target resource if any entry exists in the URT for the target resource and if the network search for the target resource locates the target resource.

4. The method of claim 1 wherein the step of initiating a network search further includes:

updating the entry in the URT, if an entry was found and either the unavailability period expired or the search threshold was exceeded;

creating an entry in the URT for the target resource, if no entry was found.

5. The method of claim 4 wherein the step of updating the URT based on the results of the network search comprises deleting the entry in the URT for the target resource if the network search for the target resource locates the target resource.

6. The method in claim 5 including the following step:

informing the source resource of the network search results.

7. In a computer network which includes a plurality of each node having interconnections between neighboring nodes, the plurality of nodes having at least one server node, each server node having one or more associated resources and a unavailable resource table (URT), each URT capable of containing entries, each entry having a resource identifier and an unavailability period, a method for reducing network resource location traffic comprising the steps of:

checking the URT of a first server node for an entry having a resource identifier that contains a representation of a target resource, in response to a request for the target resource from a source resource associated with the first server node;

determining that the target resource is unavailable if the unavailability period of the found entry has not expired, if an entry is found in the URT;

informing the source resource that the target resource is unavailable, if the target resource is determined to be unavailable;

initiating a network search for the target resource, if no entry was found in the URT or if the target resource was not determined to be unavailable; and updating the URT based on the results of the network search, if the network search for the target resource is unable to locate the target resource and deletes any entry for the target resource if the target resource is located.

8. The method of claim 7 wherein the step of initiating a network search further includes:

updating the entry in the URT, if an entry was found and the unavailability period expired;

creating an entry in the URT for the target resource, if no entry was found.

9. The method of claim 8 wherein the step of updating the URT based on the results of the network search comprises deleting the entry in the URT for the target resource if the network search for the target resource locates the target resource.

10. The method in claim 7 wherein the step of updating the URT based on the results of the network search further includes informing the source resource of the network search results.

11. A network having a plurality of interconnected nodes, at least one node in the network having an apparatus for reducing resource location traffic in a network comprising:

an unavailable resource table (URT) for storing information on unavailable resources, said table having one or more entries each entry containing an resource identifier, an unavailability period and a search threshold;

a means for checking the URT of the node for an entry having a resource identifier that contains a representation of a target resource, in response to a request for the target resource received from a source resource, the request having a bypass flag that is not set;

means for determining if the target resource is unavailable, said determining means determining that the target resource is unavailable if the checking means found an entry and the availability period of the found entry has not expired and the search threshold of the found entry has not been exceeded;

means for informing the source resource that the target resource is unavailable if the determining means determines that the target resource is unavailable;

means for initiating a network search for the target resource, if no entry was found in the URT or if the target resource was not determined to be unavailable or if the bypass flag was set; and means for updating the URT in response to the network search results, if the network search for the target resource is unable to locate the target resource and deletes any entry for the target resource if the target resource is located.

12. The apparatus off claim 11 wherein prior to the initiating means initiating a network search the update means:

updates the entry in the URT, if an entry was found by the checking means and either the unavailability period expired or the search threshold was exceeded;

creates an entry in the URT for the target resource, if no entry was found by the checking means.

13. The apparatus of claim 12 wherein the update means deletes the entry in the URT for the target resource if the network search results indicate that the target resource is not unavailable.

14. The apparatus in claim 11 wherein the informing means also informs the source resource of the network search results.

15. A network having a plurality of interconnected nodes, at least one node in the network having an apparatus for reducing resource location traffic in a network comprising:

- an unavailable resource table (URT) for storing information on unavailable resources, said table having one or more entries each entry containing an resource identifier and an unavailability period and a search threshold;
- a means for checking the URT of the node for an entry having a resource identifier that contains a representation of a target resource, in response to a request for the target resource received from a source resource;
- means for determining if the target resource is unavailable, said determining means determining that the target resource is unavailable if the checking means found an entry and the availability period of the found entry has not expired;
- means for informing the source resource that the target resource is unavailable if the determining means determines that the target resource is unavailable;
- means for initiating a network search for the target resource, if no entry was found in the URT or if the target resource was not determined to be unavailable; and
- means for updating the URT in response to the network search results,if the network search for the target resource is unable to locate the target resource and deletes any entry for the target resource if the target resource is located.

16. The apparatus off claim 15 wherein prior to the initiating means initiating a network search the update means:

- updates the entry in the URT, if an entry was found by the checking means and either the unavailability period expired or the search threshold was exceeded;
- creates an entry in the URT for the target resource, if no entry was found by the checking means.

17. The apparatus of claim 16 wherein the update means deletes the entry in the URT for the target resource if the network search results indicate that the target resource is not unavailable.

18. The apparatus in claim 15 wherein the informing means also informs the source resource of the network search results.

19. A network node server having a an apparatus for reducing resource location traffic in a network comprising:

- an unavailable resource table (URT) for storing information on unavailable resources, said table having one or more entries each entry containing an resource identifier and an unavailability period and a search threshold;
- a means for checking the URT of the node for an entry having a resource identifier that contains a representation of a target resource, in response to a request for the target resource received from a source resource;
- means for determining if the target resource is unavailable, said determining means determining that the target resource is unavailable if the checking means found an entry and the availability period of the found entry has not expired;
- means for informing the source resource that the target resource is unavailable if the determining means determines that the target resource is unavailable;
- means for initiating a network search for the target resource, if no entry was found in the URT or if the target resource was not determined to be unavailable; and
- means for updating the URT in response to the network search results,if the network search for the target resource is unable to locate the target resource and deletes any entry for the target resource if the target resource is located.

* * * * *